D. T. FISHER.
CABLE REELING MECHANISM FOR ELECTRIC LOCOMOTIVES.
APPLICATION FILED FEB. 15, 1909.
1,058,574.
Patented Apr. 8, 1913.
2 SHEETS—SHEET 1.
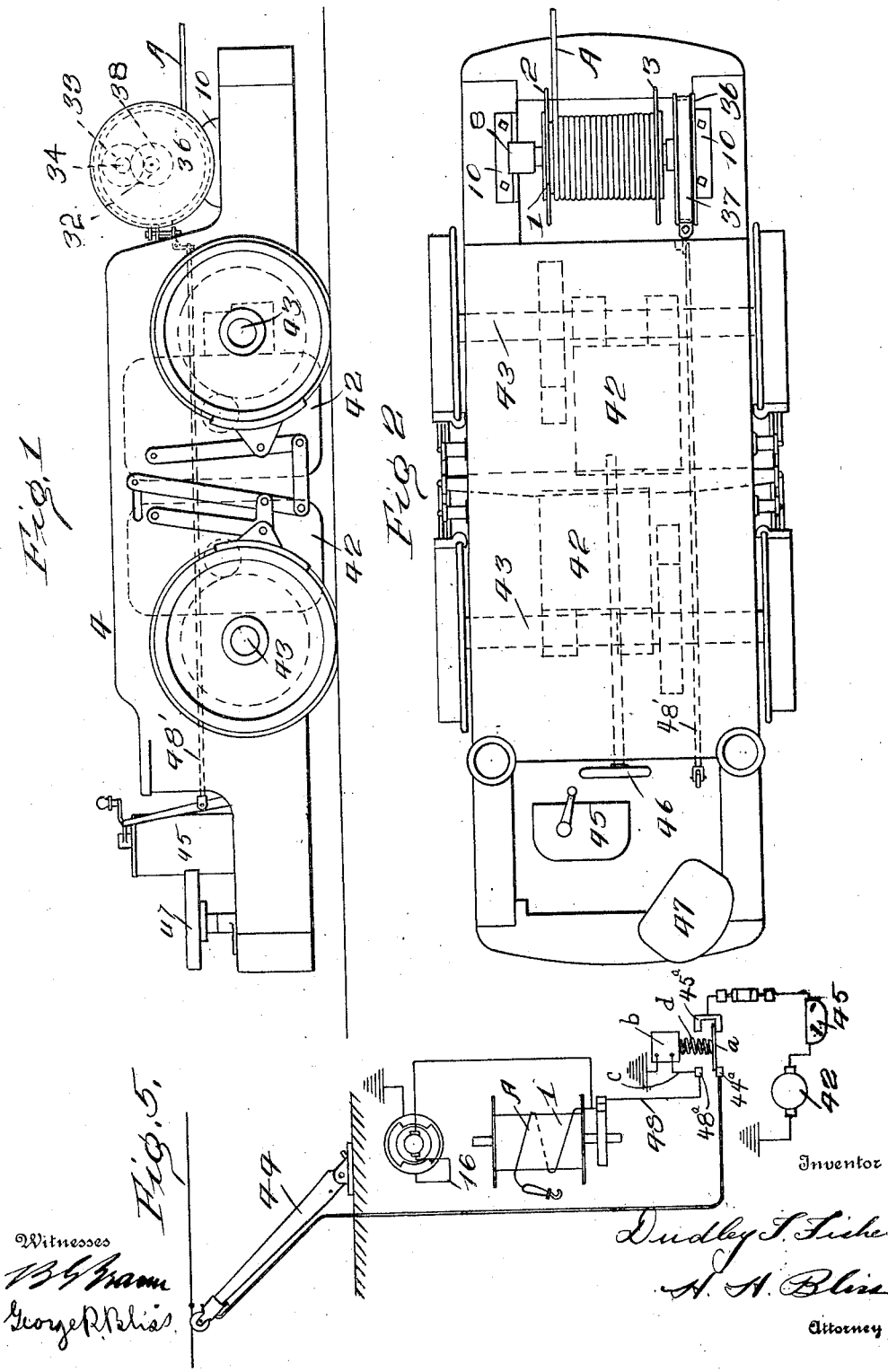

D. T. FISHER.
CABLE REELING MECHANISM FOR ELECTRIC LOCOMOTIVES.
APPLICATION FILED FEB. 15, 1909.

1,058,574.

Patented Apr. 8, 1913.

2 SHEETS—SHEET 2.

Witnesses
B. J. Braun
George R. Bliss.

Inventor
Dudley T. Fisher
H. H. Bliss
Attorney

UNITED STATES PATENT OFFICE.

DUDLEY T. FISHER, OF COLUMBUS, OHIO, ASSIGNOR TO THE JEFFREY MANUFACTURING COMPANY, A CORPORATION OF OHIO.

CABLE-REELING MECHANISM FOR ELECTRIC LOCOMOTIVES.

1,058,574.

Specification of Letters Patent.

Patented Apr. 8, 1913.

Application filed February 15, 1909. Serial No. 477,919.

*To all whom it may concern:*

Be it known that I, DUDLEY T. FISHER, a citizen of the United States, residing at Columbus, in the county of Franklin and State of Ohio, have invented certain new and useful Improvements in Cable-Reeling Mechanism for Electric Locomotives, of which the following is a specification, reference being had therein to the accompanying drawing.

This invention has as its object to provide an improved cable reeling mechanism for the gathering locomotives which are used to collect into trains the loaded mine cars from the various rooms in which the cutting operations are being carried on. The cable reeling mechanism is used to carry and to wind and unwind a conductor cable, the free end of which is secured to a stationary electrical conductor. In this way current is carried from the fixed conductor, such as a trolley wire in a principal entry to the locomotive, while it is operating over the tracks in the branch entries and rooms which are not equipped with trolley wire installation.

The improvements in the cable reeling mechanism comprise a novel arrangement of the motor parts for driving the reel and novel means for controlling the winding and unwinding of the reel, and a superior arrangement of the conductors and conductor terminals.

Figure 3:
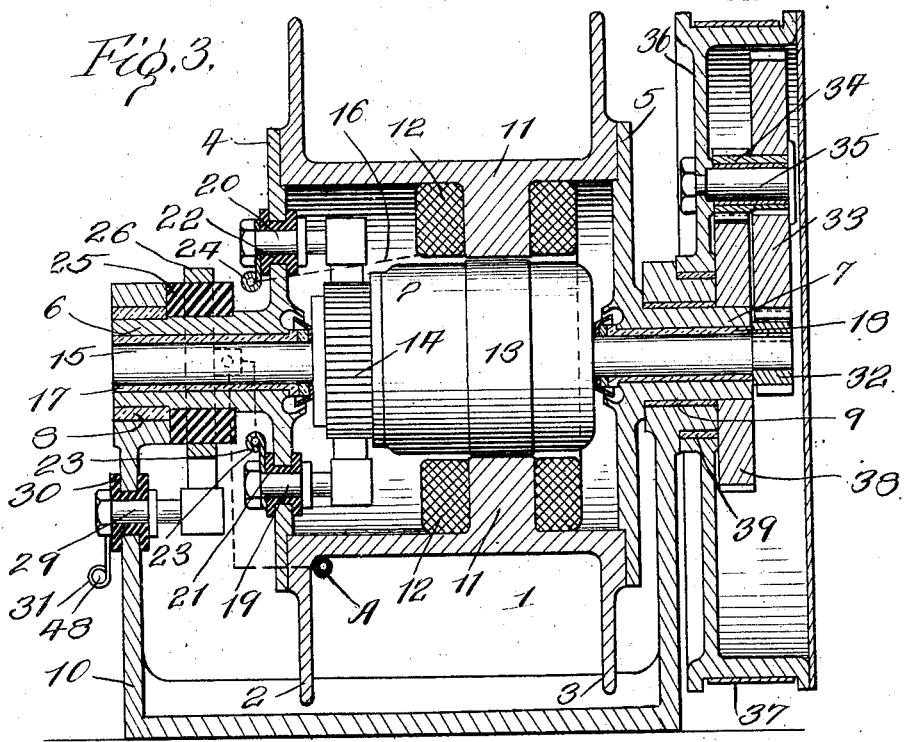
Figure 4:
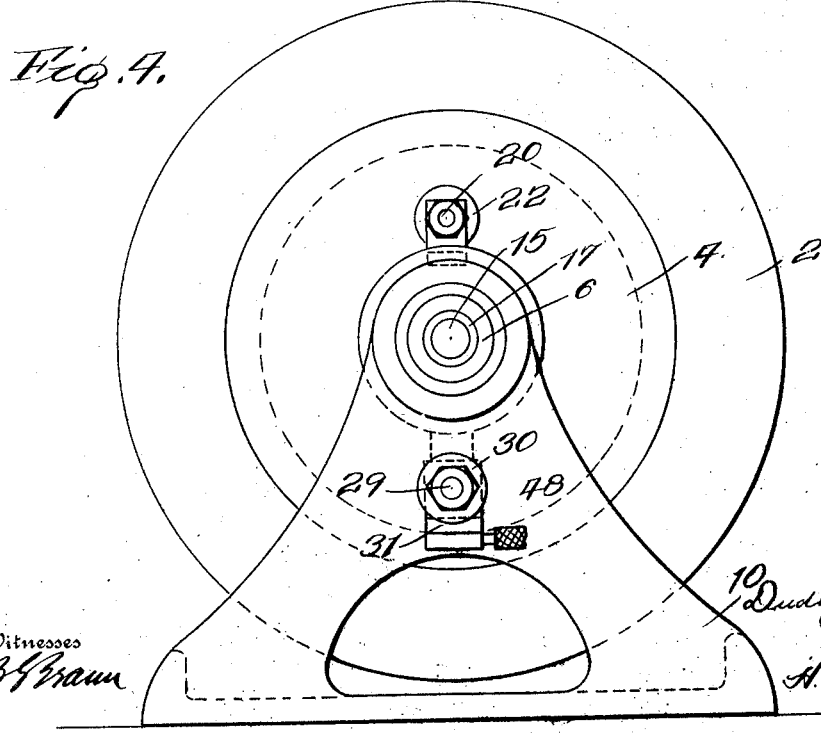

In the drawings: Figure 1 is a plan view of the locomotive embodying my invention. Fig. 2 is a side elevation of the same. Fig. 3 is a vertical longitudinal section of the cable reeling mechanism. Fig. 4 is an end view of the cable reeling mechanism. Fig. 5 is a diagram of the electrical connection of the locomotive and supply conductors.

The locomotive 4 is equipped with the motors 42, 42 which are geared to the axles 43, 43, respectively. Current is ordinarily conducted to these motors by means of the trolley mechanism 44 and passes by ground return to the generator, the current being regulated by means of the controller 45. At the rear end of the locomotive are arranged, in addition to the controller, the brake wheel 46, the motorman's seat 47 and other suitable apparatus. In addition to the trolley mechanism, the current may also be conducted to the motors by means of the conductor 48 which receives current from the conductor cable A in a manner which will be described.

Preferably I provide means for automatically disconnecting the trolley mechanism 44 and automatically connecting the cable A with the controller 45 whenever the cable is electrically energized. This means comprises a contact bar $a$ which is movable to make connection between the contact $45^a$ connected with the controller and the contact $44^a$ connected with the trolley mechanism, or between the contact $45^a$ and the contact $48^a$ connected with the cable.

$b$ is a solenoid for controlling the movements of the contact bar $a$. By means of a conductor $c$ the solenoid $b$ is connected with the ground in such a way that the solenoid is energized whenever the conductor 48 is connected with a source of electrical energy. Whenever the solenoid is energized it draws the contact bar $a$ into position to connect the contacts $48^a$ and $45^a$, thus permitting current to flow to the controller 45 from the cable A. When the solenoid $b$ is not energized, the contact bar $a$ is moved by the spring $d$ to connect the contacts $44^a$ and $45^a$, thus permitting current to flow to the controller 45 from the trolley mechanism 44.

The cable A is wound upon the drum 1, which has the lateral retaining flanges 2, 3. This drum is secured to the flanges 4, 5 of the sleeves 6, 7 which are mounted to revolve in bearing bushings 8, 9, in the frame 10 which is bolted to the front end of the locomotive.

Integral with the drum 1 are pole pieces 11, 11 provided with field coils 12, 12, the pole pieces and field coils constituting a motor field in which is mounted the armature 13 upon the shaft 15. This shaft is supported in the bearing bushings 17, 18 in the sleeves 6, 7 and is thus supported by the frame 10. The current is conducted to and from the armature coil by means of the commutator 14 and the brushes and brush holders 19, 20, which latter are supported in insulating bushings 21, 22 in the flange 4, mounted on hub 6.

23 and 24 are connectors secured to the brush holders.

Mounted on the hub 6 is an insulating ring 25 which carries a collector ring 26, from which current is gathered by a brush and brush holder 29, the latter being supported by an insulating bushing 30 in the frame 10 and having a connector 31 to receive the wire 48 from the locomotive circuit. The inner end of cable A passes through a suitable hole in the drum 1 and flange 4 and connects with the collector ring 26 in any suitable manner (connections indicated diagrammatically by dotted lines.)

A branch wire connects the collector ring 26 with the connector 23 of the brush holder 19. Electrical connection is also made between the brush holder 20 and its connector 24 and field coils 12 by the wire 16. The field coils are connected directly to the metal of the drum 1 and through the metal frame 10 to ground, thus completing a circuit by which current flows through the motor causing the armature 13 to revolve whenever the cable A is in connection with a source of current.

Upon the armature shaft 15 is keyed a spur pinion 32 engaging a spur gear 33 which together with an attached pinion 34 is mounted on a stud 35 fixed to the disk of a brake wheel 36. This brake wheel is encircled by the brake band 37 which is tightened or loosened by means of the rod 48'. The pinion 34 engages the gear 38 keyed to the sleeve 7 while the brake wheel 36 revolves on a bearing bushing 39 carried by the frame 10.

The operation of the mechanism is as follows: When the locomotive is ready to enter a room or side entry, the motorman attaches the free end of the cable A to the trolley wire in the main entry and the armature 13 immediately begins to revolve, turning the pinion 32, the gear 33 and the pinion 34. Assuming the locomotive to be stationary, the drum 1 is held by the cable against rotation and the gear wheel 38 therefore serves as an annular abutment upon which the rotating pinion 34 rolls in the direction opposite to the direction of rotation of the armature. The pinion 34 carries with it the brake wheel 36, the movement of the brake wheel being resisted by the brake band 37. It will be seen that I have provided what can be considered as a differential gearing connecting the motor armature 13 on the one hand with the drum 1 and the brake wheel 36 on the other. It is obvious that any force applied to rotate the pinion 34 is differentially transmitted to push the brake wheel 36 in one direction and the gear wheel 38 in the other direction. As the gear wheel 38 is directly connected with the drum 1, it will be seen that a winding torque is always transmitted to the drum whenever the armature 13 is rotated and that this winding torque has a directly proportional relationship to the frictional resistance offered by the band 37. And it will further be seen that the torque is not dependent upon the rate or direction of rotation of the drum. Because of the differential gearing the torque on the drum must always have a certain value dependent upon the action of the brake band 37 and can never be greater or less.

As stated, when the drum is held by the cable against rotation in the winding direction, the brake wheel is forced to rotate in the opposite direction. When the drum is forced by the cable to turn in the unwinding direction, this is compensated for by an increased speed of rotation of the brake wheel. And when the drum is permitted by the cable to rotate in the winding direction, this is compensated for by a decreased speed of rotation of the wheel.

It will be understood that by making the brake band 37 sufficiently tight, the brake wheel 36 may be completely locked against rotation. When the brake wheel is thus held, the drum 1 is directly connected with the armature and the speed of rotation will be directly proportionate to that of the armature. But I prefer under ordinary circumstances to permit the brake wheel 36 to rotate at all times.

It will be observed that the armature is rotating at all times while the conductor cable is in the electrical circuit. If the wheel 36 is not braked too heavily, the rotation of the armature is always in the same direction, i. e. the direction in which the drum rotates when it is winding cable, and this rotation of the armature acts by mechanical gearing to exert a torque upon the drum in a winding up direction under all conditions, provided the brake wheel is not held stationary. This torque takes effect as motion of the drum only as movement of the locomotive allows the cable to be wound up. When the locomotive is stationary or is moving in a direction to unwind the cable this torque acts to cause tension in the cable. If, under any conditions of winding or unwinding, the tension becomes excessive the brake wheel 36 will slip sufficiently to relieve the tension, if the brake band be properly set. It will thus be observed that tension in the cable will be maintained by the torque exerted by the armature, which torque is controlled and regulated by means of the friction band.

While the action of the armature is to rotate its own field in the same direction as that in which it rotates, the relative speed of the armature with respect to the drum, even when the locomotive is moving at a maximum velocity, is so great that the electro-magnetic and mechanical results are very much the same as though the field were stationary. Of course, proper commutation is secured by mounting the brushes upon the parts which rotate rigidly with the field. Since the sparking is in an inclosed chamber, the explosion of the mine gases by such electric arcing is rendered impossible.

I do not claim as a part of my invention a motor mounted with its armature within a reel drum to which an electric cable is connected for winding thereon, and with its field coils mounted on the drum as these features are the invention of another.

What I claim is—

1. In a cable reeling mechanism for an electric locomotive, the combination of a cable drum, a motor the armature of which is connected to tend to rotate always in the same direction when supplied with current, a planetary gear transmission between the armature and the drum having a normally freely rotatable gear carrying wheel, and a brake for controlling the rotation of the said wheel of the planetary transmission.

2. In a cable reeling mechanism for an electric locomotive, the combination of a rotatable drum, a motor for the drum of which the coils of one element are mounted to rotate with the drum and the coils of the other element are mounted to rotate relatively both to surrounding objects and to the drum, and adjustable power transmitting gearing adapted to mechanically connect the drum and last mentioned motor element to cause rotation in the same direction, or in opposite directions, at will.

3. In a cable reeling mechanism for an electric locomotive, the combination of a rotatable drum, a motor for the drum of which the coils of one element are mounted to rotate with the drum and the coils of the other element are mounted to rotate relatively both to surrounding objects and to the drum, power transmitting gearing adapted to mechanically connect the drum and last mentioned motor element, and means for controlling the said power transmitting gearing to reverse the direction of rotation of one motor element without reversing the direction of rotation of the other element.

4. In a cable reeling mechanism for an electric locomotive, the combination of a rotatable drum, a motor for the drum of which the coils of one element are mounted to rotate with the drum and the coils of the other element are mounted to rotate relatively both to surrounding objects and to the drum, power transmitting gearing adapted to mechanically connect the drum and last mentioned motor element, and means for controlling the said power transmitting gearing to vary the ratio of the said power transmitting gearing.

5. In an electric locomotive, the combination of a motor, a reel, a cable wound upon the reel and adapted to be secured to a fixed conductor, power transmitting gearing between the armature of the motor and the reel, a rotatable frame upon which the gearing is mounted, and means for controlling the rotation of said frame.

6. In an electric locomotive, the combination of a motor, a reel, a cable wound upon the reel and adapted to be secured to a fixed conductor, one element of the motor being mounted upon the reel and the other element being rotatably mounted, power transmitting gearing between the armature of the motor and the reel, a rotatable frame upon which the gearing is mounted, and means for controlling the rotation of said frame.

7. In a cable reeling mechanism for an electric locomotive, the combination of a reel, a motor both elements of which are rotatably mounted upon and one element of which is mechanically connected directly to the reel, power transmitting gearing between the two motor elements, and means for varying the gear ratio between the motor elements.

8. In a cable reeling mechanism for an electric locomotive, the combination of a rotatable cable drum, a motor, the armature of which is connected to always rotate in the same direction when supplied with current, a brake wheel rotatable independently of the drum, means for applying friction to retard rotation of the brake wheel, and a differential gear mechanism interposed between the motor armature on the one hand and the brake wheel and the cable drum on the other hand, the gear mechanism serving to transmit the motor torque in definite predetermined proportions to the brake wheel and to the cable drum irrespective of the relative rates of rotation.

In testimony whereof I affix my signature, in presence of two witnesses.

DUDLEY T. FISHER.

Witnesses:
   JAS. G. CHANDLER,
   P. W. MILLER.